US010277901B2

(12) United States Patent
Danielsson Fan (10) Patent No.: US 10,277,901 B2
(45) Date of Patent: Apr. 30, 2019

(54) ENCODING A VIDEO STREAM HAVING A PRIVACY MASK

(71) Applicant: Axis AB, Lund (SE)

(72) Inventor: Xing Danielsson Fan, Lund (SE)

(73) Assignee: Axis AB, Lund (SE)

( * ) Notice: Subject to any disclaimer, the term of this patent is extended or adjusted under 35 U.S.C. 154(b) by 67 days.

(21) Appl. No.: 15/589,350

(22) Filed: May 8, 2017

(65) Prior Publication Data

US 2018/0324436 A1    Nov. 8, 2018

(51) Int. Cl.
| | |
|---|---|
| H04N 11/02 | (2006.01) |
| H04N 19/137 | (2014.01) |
| H04N 19/119 | (2014.01) |
| H04N 19/132 | (2014.01) |
| H04N 19/159 | (2014.01) |
| H04N 19/114 | (2014.01) |
| H04N 19/70 | (2014.01) |
| H04N 19/177 | (2014.01) |
| H04N 19/51 | (2014.01) |

(Continued)

(52) U.S. Cl.
CPC ......... *H04N 19/137* (2014.11); *H04N 19/114* (2014.11); *H04N 19/119* (2014.11); *H04N 19/132* (2014.11); *H04N 19/159* (2014.11); *H04N 19/177* (2014.11); *H04N 19/51* (2014.11); *H04N 19/527* (2014.11); *H04N 19/61* (2014.11); *H04N 19/70* (2014.11)

(58) Field of Classification Search
CPC .. H04N 19/137; H04N 19/114; H04N 19/119; H04N 19/132; H04N 19/159; H04N 19/177; H04N 19/51; H04N 19/70

USPC ....................................................... 375/240.2
See application file for complete search history.

(56) References Cited

U.S. PATENT DOCUMENTS 6,101,276 A * 8/2000 Adiletta ............... H04N 19/159
                                                         375/E7.093
6,731,813 B1    5/2004 Stewart
(Continued)

FOREIGN PATENT DOCUMENTS

EP          3013050 A1     4/2016
EP          3021579 B1     10/2016
(Continued)

OTHER PUBLICATIONS

European Search Report. Application No. 17170060.2. European Patent Office, 80298 Munich, Germany. Date of Completion of the Search: Nov. 14, 2017. pp. 1-7.
(Continued)

*Primary Examiner* — Leron Beck
(74) *Attorney, Agent, or Firm* — Mollborn Patents, Inc.; Fredrik Mollborn (57) ABSTRACT

Methods and apparatus, including computer program products, implementing and using techniques for encoding a video sequence having a plurality of image frames, wherein at least some of the image frames include a privacy mask. An original total amount of motion is estimated in a received image frame. A reduced amount of motion is determined in the image frame, based on the estimated total amount of motion for the image frame and the size and position of the privacy mask. The image frames are encoded into a sequence of output image frames, wherein a temporal frame distance is adjusted based on the determined reduced amount of motion.

12 Claims, 6 Drawing Sheets

(51) Int. Cl.
*H04N 19/61* (2014.01)
*H04N 19/527* (2014.01)

(56) References Cited

U.S. PATENT DOCUMENTS

| | | | |
|---|---|---|---|
| 8,204,355 | B2 | 6/2012 | Saito et al. |
| 8,319,859 | B2 | 11/2012 | Kim et al. |
| 8,879,001 | B2 * | 11/2014 | Dane .............. H04N 19/176 348/625 |
| 2003/0214592 | A1 | 11/2003 | Ikeyama |
| 2005/0275723 | A1 | 12/2005 | Sablak et al. |
| 2006/0045381 | A1 | 3/2006 | Matsuo et al. |
| 2008/0232468 | A1 | 9/2008 | Kwon et al. |
| 2012/0098927 | A1 | 4/2012 | Sablak |
| 2014/0181208 | A1 * | 6/2014 | Robinson .......... G06F 17/30867 709/204 |
| 2016/0316219 | A1 | 10/2016 | Yuan et al. |

FOREIGN PATENT DOCUMENTS

| | | |
|---|---|---|
| JP | 2006304250 A | 11/2006 |
| JP | 2011151732 A | 8/2011 |

OTHER PUBLICATIONS

Axis' Zipstream Technology—More Video, Less Storage; © 2016 Axis Communications; 12 pp.

Ma et al.; "Adaptive GOP Structure Based on Motion Coherence"; Satellite Data Compression, Communication, and Processing V, edited by Bormin Huang, Antonio J. Plaza, Raffaele Vitulli; Proc. of SPIE vol. 7455, 74550T · © 2009 SPIE. 8 pp.

User Manual Axis P3214-VE Network Camera. © Axis Communications AB; 1 page.

User Manual Ver. M2.10; Axis Video Motion Detection 4; Date: Apr. 2017; © Axis Communications AB, 2016-2017. 12 pp.

* cited by examiner

| 0 | 2 | 3 | 1 | 0 |
|---|---|---|---|---|
| 0 | 2 | 2 | ■ |   |
| 0 | 1 | 2 | 3 | 4 |

ENCODING A VIDEO STREAM HAVING A PRIVACY MASK

BACKGROUND

The present invention relates to video encoding, and more specifically, to encoding a video stream that includes one or more privacy masks.

Monitoring cameras are used in many different applications, both indoors and outdoors, for monitoring a variety of environments. Images depicting a captured scene may be monitored by, e.g., an operator or a guard. In certain situations there may be a need to treat one part of a captured image differently from another part, such as when there is a need to exclude part of an image, for example, in the interest of personal integrity.

In such instances, an operator may define one or more privacy masks during set-up of the surveillance equipment. A privacy mask may be static or dynamic. Static privacy masks typically stay in place until the operator decides to move or remove them. Dynamic privacy masks may change over time, and the operator may also define when the privacy mask should be applied. For instance, the operator could define a dynamic privacy mask such that if a face is detected within the masked area, the face will be masked out, but otherwise no mask will be applied to the area.

Privacy masks are often applied to the image as an overlay. Some privacy masks take the form of an opaque area (e.g. a uniformly black area), while other privacy masks take the form of blurring, where image data is "smeared" out over the privacy mask area, or pixelation, where the image inside the privacy mask is divided into pixelation blocks and all pixels of a pixelation block are given the same value, such that the image appears blocky inside the privacy mask area. The privacy mask often has a polygonal shape, but other shapes are also possible, which more closely follow the shape of the area to occlude.

Images captured by the camera are normally transmitted to a site of use, such as a control center, where the images may be viewed and/or stored. Alternatively, they can be stored in so-called "edge storage", i.e., storage at the camera, either on board the camera, such as on an SD-card, or in connection with the camera, such as on a NAS (network attached storage). Before transmission or edge storage, the images are typically encoded to save bandwidth and storage space. Encoding may be performed in many different ways, e.g., in accordance with the H.264 standard or other encoding standards. Most, if not all, video encoding is lossy, meaning that information present in the original images is lost during encoding and cannot be regained in decoding. There is a trade-off between reducing of the number of bits required to represent the original images and the resulting image quality. Efforts have been made to develop encoding schemes that make as efficient use of the available bits as possible.

In many digital video encoding systems, two main modes are used for compressing video frames of a sequence of video frames: intra mode and inter mode. In the intra mode, the luminance and chrominance channels (or in some cases RGB or Bayer data) are encoded by exploiting the spatial redundancy of the pixels in a given channel of a single frame via prediction, transform, and entropy coding. The encoded frames are called intra-frames (also referred to as "I-frames"). Within an I-frame, blocks of pixels, also referred to as macro blocks, coding units or coding tree units, are encoded in intra-mode, that is, they are encoded with reference to a similar block within the same image frame, or raw coded with no reference at all.

In contrast, the inter mode exploits the temporal redundancy between separate frames, and relies on a motion-compensation prediction technique that predicts parts of a frame from one or more previous frames by encoding the motion in pixels from one frame to another for selected blocks of pixels. The encoded frames are referred to as inter-frames, P-frames (forward-predicted frames), which can refer to previous frames in decoding order, or B-frames (bi-directionally predicted frames), which can refer to two or more previously decoded frames, and can have any arbitrary display order relationship of the frames used for the prediction. Within an inter-frame, blocks of pixels may be encoded either in inter-mode, meaning that they are encoded with reference to a similar block in a previously decoded image, or in intra-mode, meaning that they are encoded with reference to a similar block within the same image frame, or raw-coded with no reference.

The encoded image frames are arranged in groups of pictures (GOPs). Each GOP is started by an I-frame, which does not refer to any other frame, and is followed by a number of inter-frames (i.e., P-frames or B-frames), which do refer to other frames. Image frames do not necessarily have to be encoded and decoded in the same order as they are captured or displayed. The only inherent limitation is that a frame that serves as a reference frame must be decoded before other frames that use it as reference can be encoded. In surveillance or monitoring applications, encoding is generally done in real time, meaning that the most practical approach is to encode and decode the image frames in the same order as they are captured and displayed, as there will otherwise be undesired latency.

Two important techniques that can be used to reduce the bitrate are known as "Dynamic GOP" and "Dynamic Frames Per Second" (FPS), respectively. The dynamic GOP reduces the bitrate by avoiding storage-consuming I-frame updates. Typically, surveillance scenes with limited motion can be compressed into a very small size without any loss of detail. This algorithm makes a real-time adaption of the GOP length (i.e., the number of frames in the GOP) on the compressed video according to the amount of motion. As a general rule, for a static or low motion scene, a longer GOP length results in a lower output bitrate, since inter-frames generally require fewer bits for representation than intra-frames. An example of dynamic GOP is described in European Application No. EP17160703.9, filed on Mar. 14, 2017.

The dynamic FPS reduces the bitrate by avoiding unnecessary encoding of video frames by omitting them from the stream. The amount of motion in a scene can be used as a control variable for determining the FPS. For example, a static surveillance scene can be encoded with a significantly reduced frame rate, even though the camera may be capturing and analyzing video at full frame rate. Since motion is used as a control variable, a small moving object far away may not render at full frame rate. However, objects approaching the camera will cause the frame rate to increase, so as to capture every important detail of the objects. The number of delivered frames per second is also restricted automatically by the camera, which will save a substantial amount of data in many scenes.

SUMMARY

According to a first aspect, the invention relates to a method, in a computer system, for encoding a video sequence having a plurality of image frames, wherein at least some of the image frames include a privacy mask. The method includes:
   estimating an original total amount of motion in a received image frame;
   determining a reduced amount of motion in the image frame, based on the estimated total amount of motion for the image frame and the size and position of the privacy mask; and
   encoding the plurality of image frames into a sequence of output image frames, wherein a temporal frame distance is adjusted based on the determined reduced amount of motion.

This provides a way of taking into account motion that occurs behind a privacy mask, whether the privacy mask is static or dynamic, and ensuring that such motion is considered when determining the total amount of motion for the image frame. By using a reduced amount of motion rather than an estimated original amount of motion it is possible to adjust the temporal frame distance (e.g., increasing the GOP length to reduce the number of I-frames, and/or lowering the dynamic FPS such that fewer image frames are encoded). This results in a reduction of the bitrate with which the video sequence is encoded, and thereby also reduces the required storage space for the encoded video sequence, compared to conventional techniques.

According to one embodiment the temporal frame distance represents a distance between image frames input to an encoder. By adjusting the distance between the image frames input to the encoder, the number of image frames to be encoded will be smaller, thereby reducing the amount of processing that the encoder must perform, and also producing fewer encoded images output from the encoder, which saves storage space.

According to one embodiment, the temporal distance represents an intra-frame distance in the sequence of output image frames output from an encoder. That is, by increasing the temporal distance, the distance between I-frames can be increased, and since encoding I-frames require more storage space, valuable resources can be saved by encoding having a longer GOP distance and encoding fewer I-frames.

According to one embodiment, estimating an original total amount of motion in the received image frame includes estimating a motion map of the image frame, the motion map dividing the image frame into blocks, wherein each block contains information about the amount of motion taking place in the block, and estimating the original total amount of motion in the image frame from the estimated motion in the individual blocks. This makes it possible to estimate motion in various parts of the image, which can subsequently be compared to the size and location of the privacy mask, and determine how to best reduce the estimated total amount of motion.

According to one embodiment, the privacy mask coincides with one or more blocks of the motion map. Having privacy masks whose borders align with the borders of one or more of the blocks facilitate the calculations that need to take place when determining how to reduce the amount of motion. However, it should be noted that having aligned privacy mask borders and block borders is not a requirement. Even in situations where there is no alignment between the privacy mask borders and the borders of the bocks, it is still possible to determine which blocks are affected by the privacy mask and to calculate a reduced amount of motion.

According to one embodiment, the method can include receiving data specifying one or more of: the type, size and position of the privacy mask. That is, a user may choose the type, size and position of the privacy mask, or similar data may be received from some other entity that can determine the type, size and position of the privacy mask in the image frame.

According to one embodiment, the privacy mask is one of: an opaque privacy mask, a blurring privacy mask, and a pixelation privacy mask. That is, the inventive techniques described herein can be applied to various types of privacy masks, and are thus usable in a large number of situations.

According to one embodiment, determining a reduced amount of motion includes deducting from the estimated original total amount of motion all motion occurring behind the opaque privacy mask. That is, when the privacy mask completely obscures the underlying area, the underlying area can be treated as if there is not any motion at all, since an observer will not see any motion.

According to one embodiment, determining a reduced amount of motion includes deducting from the estimated original total amount of motion a portion of the motion occurring behind the pixelation privacy mask. That is, when the privacy mask does not completely obscure the underlying area, it might be useful not to deduct all motion occurring in the underlying area, as the pixelation reduces some of the spatial and temporal complexity in the area of the image that is covered by the pixelation privacy mask, but does not create a completely static area, as in the case of a completely opaque privacy mask.

According to one embodiment, the temporal frame distance is adjusted dynamically in response to receiving and determining reduced amounts of motion for additional frames in the video sequence. Having the ability to dynamically determine and change the GOP length and/or the FPS, as opposed to a fixed setting, may enable a more efficient use of bits while delivering good quality images of interesting events in the captured scene.

According to a second aspect, the invention relates to an encoder system for encoding a video sequence having a plurality of image frames, wherein at least some of the image frames include a privacy mask. The system includes a motion estimation module and an encoder. The motion estimation module configured to: estimate an original total amount of motion in a received image frame, and determine a reduced amount of motion in the image frame, based on the estimated total amount of motion for the image frame and the size and position of the privacy mask. The encoder is configured to encode the plurality of image frames into a sequence of output image frames, wherein a temporal frame distance is adjusted based on the determined reduced amount of motion. The system advantages correspond to those of the method and may be varied similarly.

According to a third aspect, the invention relates to a computer program for encoding a video sequence having a plurality of image frames, wherein at least some of the image frames include a privacy mask. The computer program contains instructions corresponding to the steps of:
   estimating an original total amount of motion in a received image frame;
   determining a reduced amount of motion in the image frame, based on the estimated total amount of motion for the image frame and the size and position of the privacy mask; and
   encoding the plurality of image frames into a sequence of output image frames, wherein a temporal frame distance is adjusted based on the determined reduced amount of motion.

The computer program involves advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

As was described above, one goal with the various embodiments of the current invention is to encode a video sequence having a plurality of image frames, in which at least some of the image frames include a privacy mask, in a more efficient way that allows further reduction of the bit rate compared to conventional encoding techniques.

Conventional technologies for video compression, such as the "Zipstream" technology available from Axis AB of Lund, Sweden, have the ability of estimating motion in image frames, and then using these estimations to determine dynamic GOP and dynamic FPS. In the Zipstream implementation, this works as follows.

Zipstream analyzes the motion in an image to derive a frame motion level, for example, by comparing a current frame to one or more previous frames. The frame motion level can be represented by a value, for example, between 0 and 10, where 0 indicates no motion and 10 indicates high motion for the image. If only a portion of the image contains motion, the Zipstream algorithm will reduce the motion level for the image by some amount, for example, to 8 instead of 10. This reduced motion level is used when setting the GOP length and the FPS. For example, a motion level of 10 may mean keeping the default GOP, whereas a motion level of 8 may mean increasing the GOP length by a small amount. More details on deriving a frame motion level can be found, for example, in European Patent No. EP 3021579, which is assigned to the assignees of the present application, and which is incorporated herein by reference in its entirety.

However, as the inventor has realized, the motion level can easily be overestimated when a privacy mask is applied to an image frame, as the motion behind the area obscured by the privacy mask will be included in the motion estimation. For example, assume that a small area of the image that is covered by a black privacy mask and contains motion. In such a scenario, the Zipstream algorithm would use the original image to perform motion detection, decide on a slightly reduced motion level, say 8 instead of 10, and consequently increase the GOP length. However, since all the motion in the image is obscured by the black privacy mask, the encoder is really encoding a static scene, and could instead safely have set the GOP length to a significantly higher value. A lower frame rate for the Dynamic FPS could also have been set, and these changes would together reduce the bit rate and save a significant amount of storage space for the encoded images.

This problem is addressed by the various embodiments of the invention described herein, by using available position and size information for a privacy mask to deduct some amount of motion from the Zipstream motion detection algorithm output. Then, the GOP length, i.e., the interval between I-frames, and/or the FPS setting are adjusted based on the modified motion. The amount of deducted motion typically depends on whether a static area of the image is covered by the privacy mask, or whether there is motion in the area of the image that is covered by the privacy mask. If the area is static, no motion needs to be subtracted.

When motion based GOP length and motion based FPS is used in combination with privacy mask information for an image, the methods in accordance with the various implementations described herein will allow further reduction of the bit rate (and thereby required storage space) compared to existing solutions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The techniques in accordance with various embodiments of the invention will now be described by way of example and with reference to the figures.

Figure 1:
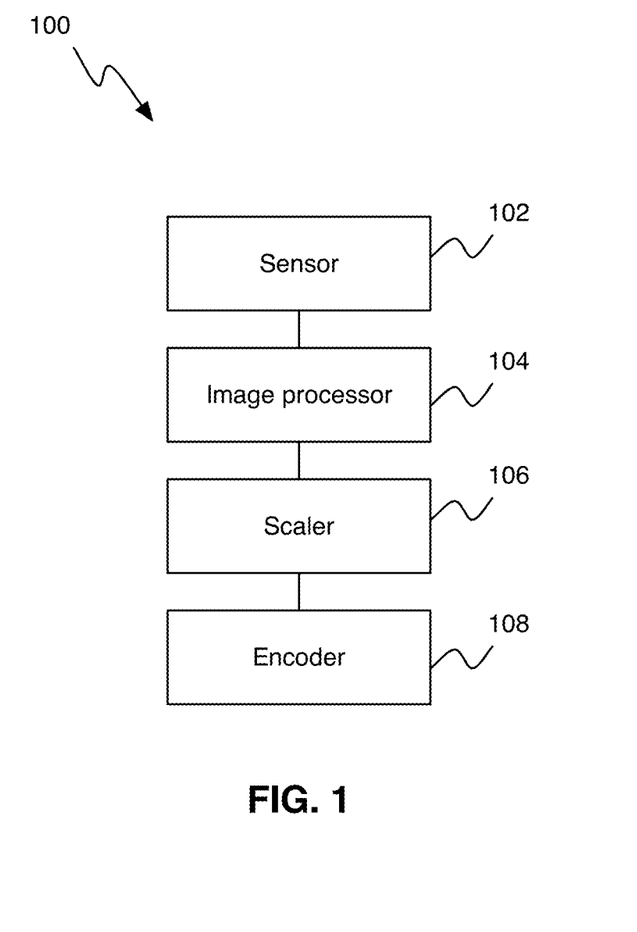
FIG. 1 shows a system for encoding a video sequence having a plurality of image frames, in accordance with one embodiment.

FIG. 1 is a schematic block diagram illustrating a system 100 in which the image encoding techniques in accordance with the various embodiments can be implemented. The system 100 can be implemented, for example, in a camera that captures images (e.g., a video sequence) of a scene.

Figure 2:
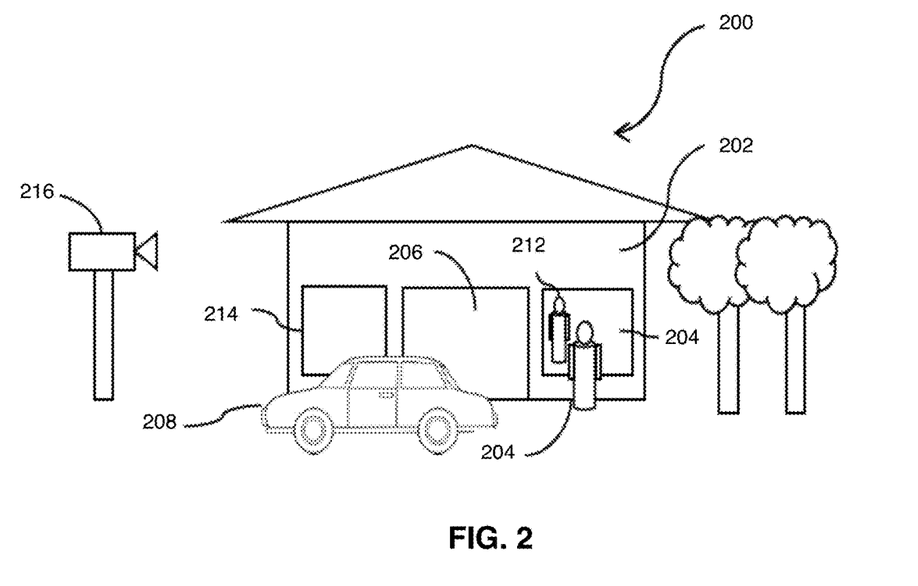
FIG. 2 shows an example of a scene monitored by a camera.

An example of a scene monitored by a camera is shown in FIG. 2. In the scene 200, there is a house 202 with windows 204, 214, and a doorway 206. A car 208 is parked in front of the house, and a first person 210 is standing outside the house. A second person 212 is in the house, visible through one of the windows 204, 214.

Figure 3:
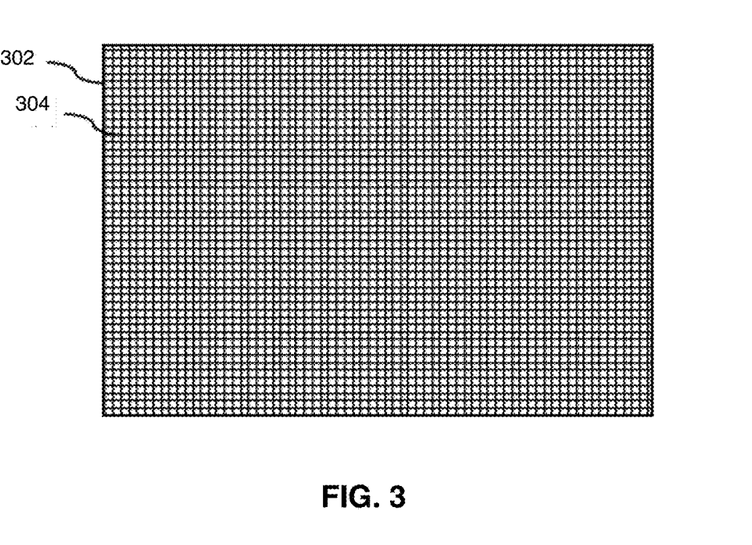
FIG. 3 shows an example of a principal structure of an image captured by the camera in FIG. 2.

A camera 216 captures images of the scene, using the sensor 102 of system 100 in the camera. FIG. 3 shows the principal structure of an image 302 captured by the sensor 102. The image 302 is made up of a number of pixels 304, corresponding to the pixels of the image sensor 102. The image may, for instance, be made up of 1280×720 pixels, 1920×1080 pixels, or 3840×2160 pixels.

Figure 4:
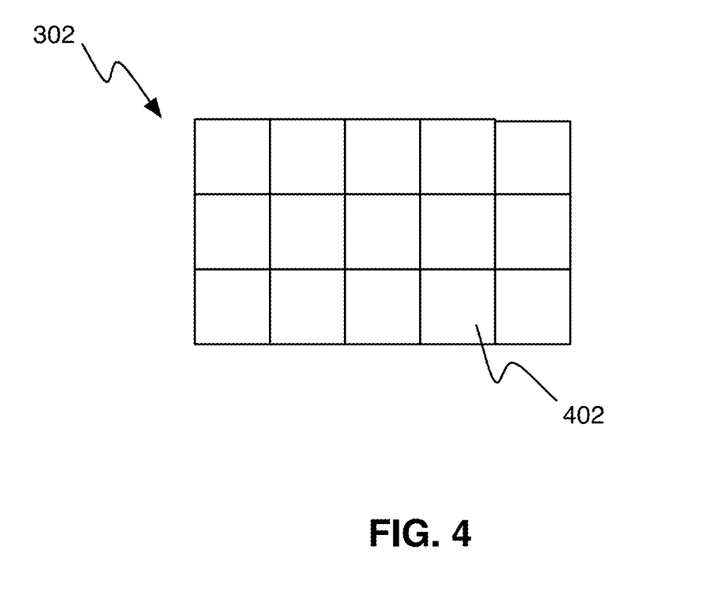
FIG. 4 shows an example of grouping pixels of the image in FIG. 3 into encoding units, in accordance with one embodiment.

The image captured by the sensor 102 is sent to an image processing unit 104, which processes the image. The processing of the image can include, for example, noise reduction, local tone mapping, spatial and temporal filtering, etc. For purposes of the various embodiments of the invention described herein, one important operation performed by the image processing unit 104 includes grouping the pixels 304 of the image 302 into encoding units 402 of neighboring pixels 304, as shown in FIG. 4. The encoding units 402 are also referred to as blocks, macroblocks, pixel blocks, coding tree units, or coding units. An encoding unit 402 is typically square and made up of, e.g., 8×8, 15 16×16, or 32×32 pixels. However, it is also possible to group the pixels 304 into encoding units 402 of other sizes and shapes. It should be noted that the size of the encoding units 402 in FIG. 4 is exaggerated compared to the size of the pixels in FIG. 3, for purposes of illustration and explanation. In a real-life scenario, there would typically be a much larger number of encoding units 402 for the number of pixels 304 of FIG. 3. A motion value is determined for each encoding unit 402, such that a motion map is created. The motion value can be determined in a number of ways, for example, as described in European Patent No. EP 3021579, referenced above.

Figure 5:
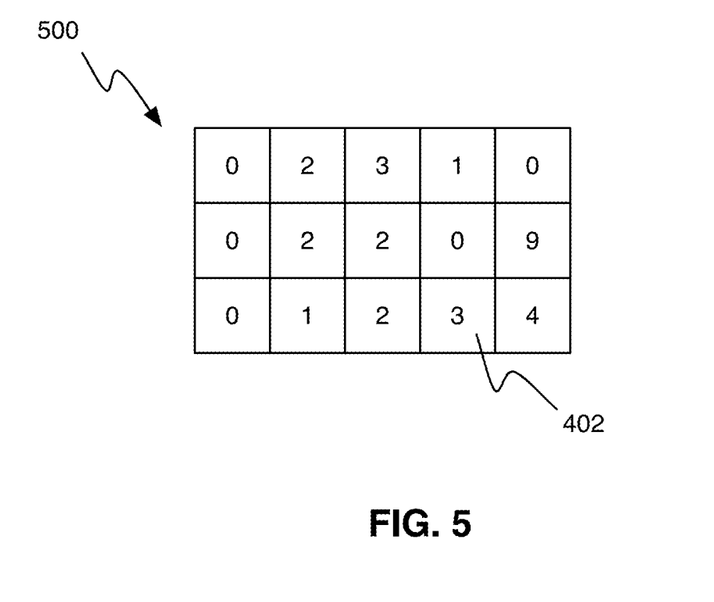
FIG. 5 shows an example of a motion map, in accordance with one embodiment.

A schematic example of a motion map 500 containing motion values for each encoding block 402 is shown in FIG. 5. As was described above, typically a larger value indicates more motion, and a smaller value indicates less motion. Thus, as can be seen in the example of FIG. 5, most of the motion occurs along the rightmost edge of the image, and there is no motion along the leftmost edge of the image. The individual motion values for the respective encoding blocks 402 are then used to estimate an original total amount of motion for the image frame. This can be done in several ways, for example, by adding the individual values of the blocks and comparing the total value to certain pre-defined thresholds, which represent different motion levels, and then assign an estimated original total amount of motion based on the comparison.

Figure 6:
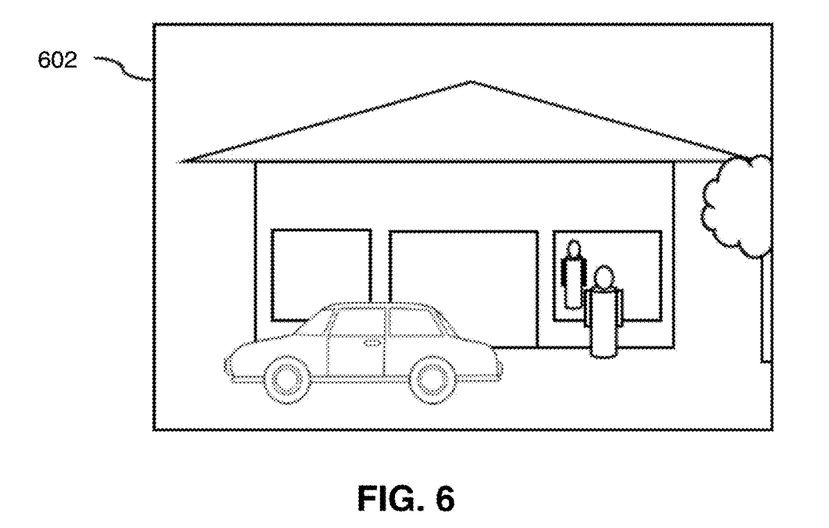
FIG. 6 shows an image captured by the camera in FIG. 2.
Figure 7:
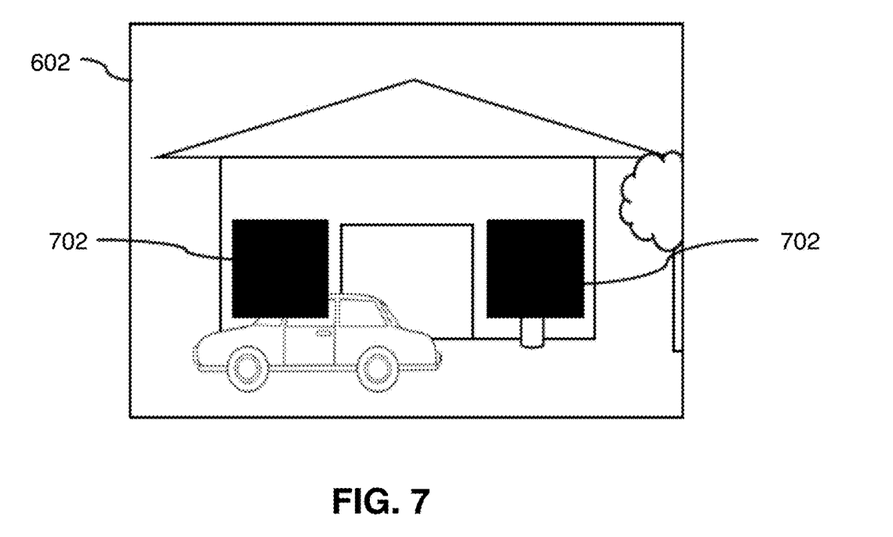
FIG. 7 shows the image of FIG. 6 with privacy masks applied to portions of the image.

FIG. 6 shows an image 602 captured by the camera 216. In the image 602, the second person inside the house is visible through the window. The purpose of monitoring the scene 200 may be to keep track of what happens outside the house 202, and not what happens inside the house 202. It may therefore be desirable to mask out those parts of the image 602 that show the inside of the house 202. As illustrated in FIG. 7, a user of the camera 216 may specify privacy mask areas 702 in which image data is to be blocked. In FIG. 7, the privacy masks 702 are simply illustrated as black rectangles. Image data behind the privacy masks 702 will thus not be seen by an operator watching footage from the scene 200.

Figure 8A:
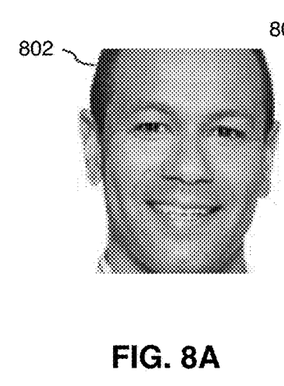
FIGS. 8A-8C show the impact of different privacy masks applied to an image of a human face.

It should be noted that the privacy masks 702 may also take forms other than opaque blocks. For instance, instead of just overlaying a black rectangle on the image, a pixelated privacy mask may be used. In FIG. 8*a*, an image of a human face 802 is shown. This face may be part of an image of a scene in which it is desirable to mask out the face, such that the person appearing in the scene cannot be identified. A pixelation is done in FIG. 8*b*, in which pixels in the image are grouped into pixelation, groups 804. For each pixelation group 804, all pixels in the pixelation group 804 are set to a common value that is representative of the pixels in that pixelation group 804. For instance, an average of all the pixel values in the pixelation group 804 may be used as the common value. There are also variations of pixelation, in which the value of a single pixel in the group is used as the common value for all pixels in the same pixelation group, and variations in which an average of a subset of the pixels in the pixelation group is used as the common value.

Figures 8B, 8C:
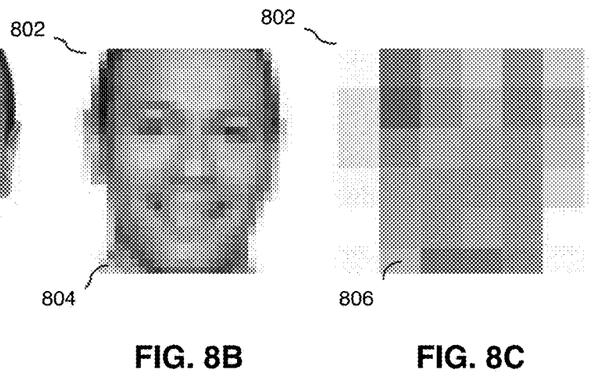

As may be seen in FIG. 8*b*, it is still possible to detect that there is a face 802 in the image. For someone who knows the person in the image, it may even be possible to recognize him. FIG. 8*c* shows an example in which pixelation groups 806 of larger size are used. In the same way as in FIG. 8*b*, a common pixel value is set for all pixels in a pixelation group 806, but since the pixelation groups are larger, less information is left in the masked area, making it difficult to even tell that there is a face 802. The size of the pixelation groups may be chosen depending on factors such as the size of the image, the distance to the objects that are to be masked out, and the degree to which the objects are to be made unidentifiable.

Typically, the borders of the privacy masks are adjusted such that they coincide with the borders of the encoding units 402, such that a privacy mask covers a certain number of whole encoding units 402. The privacy mask is typically applied to the image by the scaler 106, which also performs a number of other operations, such as downscaling or upscaling the image, rotating the image, adding various types of overlays, etc., before the final image to be encoded is sent to the encoder 108.

Figure 9:
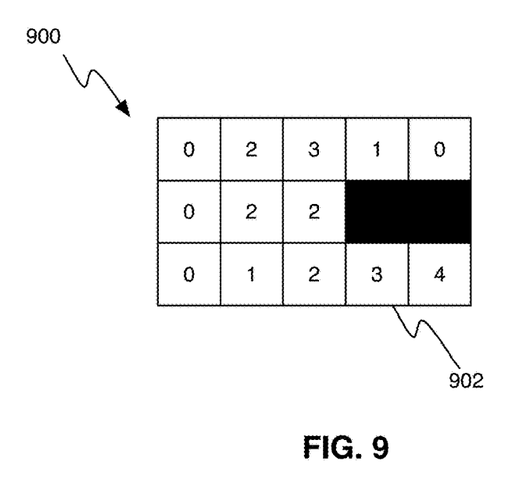
FIG. 9 shows the motion map of FIG. 5 but with a privacy mask applied to a portion of the encoding units, in accordance with one embodiment of the invention.

FIG. 9 schematically shows a motion map 900 corresponding to the motion map 500 of FIG. 5, but where the privacy mask 902 has been applied. Since the position and size of the privacy mask is now known, the system 100 can now examine the encoding units 402 corresponding to the privacy mask 902 and determine whether any motion adjustments need to be made to the previously determined total amount of motion for the image. As can be seen by comparing the motion maps 500 and 900 of FIGS. 5 and 9, respectively, the encoding units that are covered by the privacy mask 900 contain no motion (i.e., both encoding units have a zero motion value). Thus, the motion would be the same (i.e., no motion) whether or not a privacy mask is applied to these encoding units, and no adjustments to the total amount of motion in the image needs to be made.

However, if the encoding units behind the privacy mask 900 had non-zero values (i.e. there was motion detected in these encoding units), then the motion of these encoding units would be set to zero, and a reduced amount of motion would be determined for the image.

It should be noted that there may be situations in which it may desirable not to deduct all the motion occurring in encoding units that are covered by a privacy mask. For example, a privacy mask may sometimes only overlap a portion of a block and not the entire block. In such scenarios, only a portion of the motion may be deducted for the block that is only partly covered by the privacy mask, e.g., changing the motion of an encoding unit from 10 to 5, for example, instead of changing it to zero, before calculating a reduced amount of motion for the image.

Typically, the determination of reduced amounts of motion occurs dynamically, as frames arrive from the sensor. While it is possible to determine a reduced amount of motion for each individual frame, this is typically not necessary in real-life scenarios. It may, for example, be sufficient to make the determination for every other frame, or at an even lower frame rate. How often to make this determination is something that can be configured by a person having ordinary skill in the art, based on the specific circumstances at hand.

Once the reduced amount of motion has been determined for an image frame, the reduced amount of motion can be used to adjust a temporal frame distance. The temporal frame distance can represent the temporal distance between image frames that are sent from the scaler 106 to the encoder 108, i.e., the FPS, or expressed differently, how many frames can be omitted from the video stream prior to encoding. The temporal frame distance can also represent suggested GOP length to be used by the encoder 108 when encoded image frames. In a typical monitoring or surveillance situation, a GOP length leading to one I-frame per second is quite commonly used. This means with a frame rate of, for example, 30 FPS, a GOP length of 30 is often used. However, it should be understood that this can vary significantly, depending on the type of surveillance situation, and on the types, sizes and locations of the privacy masks, as described above.

Figure 10:
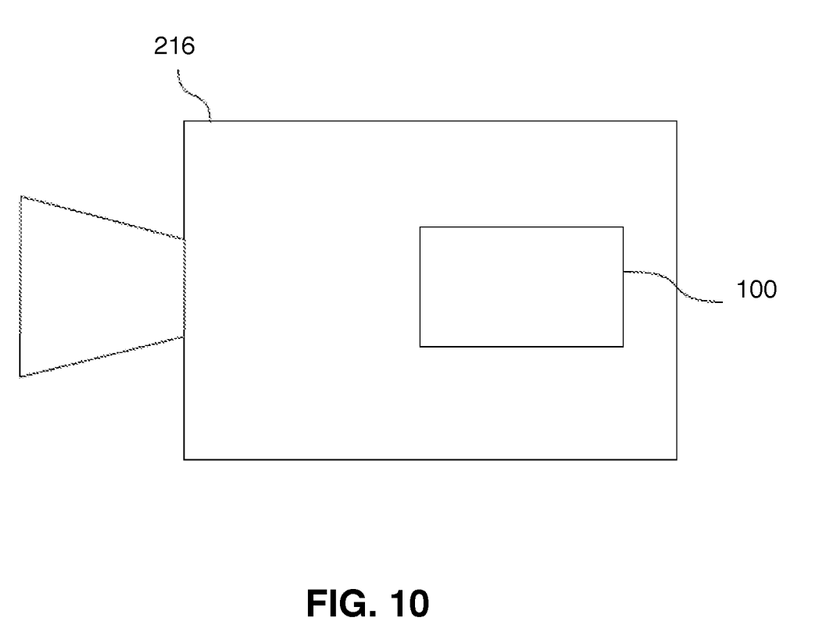
FIG. 10 shows a schematic example of a camera in which various embodiments of the invention can be implemented.

In FIG. 10, a camera 216 is shown, which includes a system 100, such as the one shown in FIG. 1. The camera 216 also has a number of other components, but as these are not part of the present invention, they are not shown and will not be further discussed here. The camera 216 may be any kind of camera, such as a visual light camera, an IR camera or a thermal camera.

As described in connection with FIG. 12, the encoding system 100 may be integrated in a camera 216. However, it is also possible to arrange some parts or the entire the encoding system separately 100, and to operatively connect it to a camera. It is also possible to transmit images from a camera to, e.g., a control center without privacy masks, and to apply privacy masks in the control center, e.g., in a VMS (Video Management System). In such a case, the encoding system may be arranged in the VMS or otherwise in the control center and used for so-called transcoding, where encoded images are received from the camera, decoded and then re-encoded, but now with the privacy mask. This may be of interest if different access rights apply to different users of the images. For instance, it may be desirable to record video sequences without privacy masks for later forensic use by the police, but a guard watching live transmissions may not be allowed to see the unasked images.

The various embodiments of the invention described herein can be used with any encoding scheme using a GOP structure with an intra-frame and subsequent inter-frames, e.g., H.264, H.265 MPEG-4 Part 2, VP8, or VP9, all of which are familiar to those having ordinary skill in the art.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for encoding a video sequence comprising a plurality of image frames, the method comprising:
   estimating a motion map of an image frame, the motion map dividing the image frame into blocks, wherein each block contains information about the amount of motion taking place in the block;
   estimating an original total amount of motion in the image frame from the estimated motion in the individual block;
   receiving data specifying a size and a position of a privacy mask overlay to be applied to the image frame to occlude an area of the image frame, wherein the privacy mask overlay coincides with one or more blocks of the motion map;
   determining a reduced amount of motion in the image frame, based on the estimated total amount of motion for the image frame and the size and position of the privacy mask overlay, by deducting, from the estimated original total amount of motion, at least a portion of the motion occurring in the blocks coinciding with the privacy mask overlay; and
   encoding the plurality of image frames into a sequence of output image frames, wherein a distance between image frames input to an encoder, or an intra frame distance in a sequence of output image frames from the encoder, is adjusted based on the determined reduced amount of motion.

2. The method of claim 1, further comprising:
   receiving data specifying a type of the privacy mask overlay.

3. The method of claim 2, wherein the type of the privacy mask overlay is one of: an opaque privacy mask overlay, a blurring privacy mask overlay, and a pixelation privacy mask overlay.

4. The method of claim 3, wherein, if the type of the privacy mask overlay is an opaque privacy mask overlay, determining a reduced amount of motion includes deducting from the estimated original total amount of motion all motion occurring behind the opaque privacy mask overlay.

5. The method of claim 3, wherein, if the type of the privacy mask overlay is a pixelation privacy mask overlay, determining a reduced amount of motion includes deducting from the estimated original total amount of motion a portion of the motion occurring behind the pixelation privacy mask.

6. The method of claim 1, wherein the temporal frame distance is adjusted dynamically in response to receiving and determining reduced amounts of motion for additional frames in the video sequence.

7. An encoder system for encoding a video sequence comprising a plurality of image frames, the encoder system comprising:
   a motion estimation module configured to:
      estimate a motion map of an image frame, the motion map dividing the image frame into blocks, wherein each block contains information about the amount of motion taking place in the block;
      estimate an original total amount of motion in the image frame from the estimated motion in the individual blocks,
      receive data specifying a size and a position of a privacy mask overlay to be applied to the image frame to occlude an area of the image frame, wherein the privacy mask overlay coincides with one or more blocks of the motion map, and
      determine a reduced amount of motion in the image frame, based on the estimated total amount of motion for the image frame and the size and position of the privacy mask overlay, by deducting, from the estimated original total amount of motion, at least a portion of the motion occurring in the blocks coinciding with the privacy mask overlay; and
   an encoder configured to:
      encode the plurality of image frames into a sequence of output image frames, wherein a distance between image frames input to an encoder, or an intra frame distance in a sequence of output image frames from the encoder, is adjusted based on the determined reduced amount of motion.

8. A computer program product for encoding a video sequence comprising a plurality of image frames, wherein at least some of the image frames include a privacy mask, the computer program product comprising a non-transitory computer readable storage medium having program code embodied therewith, the program code being executable by a processor to perform a method comprising:
   estimating a motion map of an image frame, the motion map dividing the image frame into blocks, wherein each block contains information about the amount of motion taking place in the block;
   estimating an original total amount of motion in the image frame from the estimated motion in the individual blocks;
   receiving data specifying a size and a position of a privacy mask overlay to be applied to the image frame to occlude an area of the image frame, wherein the privacy mask overlay coincides with one or more blocks of the motion map;
   determining a reduced amount of motion in the image frame, based on the estimated total amount of motion for the image frame and the size and position of the privacy mask overlay, by deducting, from the estimated original total amount of motion, at least a portion of the motion occurring in the blocks coinciding with the privacy mask overlay; and encoding the plurality of image frames into a sequence of output image frames, wherein a distance between image frames input to an encoder, or an intra frame distance in a sequence of output image frames from the encoder, is adjusted based on the determined reduced amount of motion.

9. The computer program product of claim 8, wherein the method further comprises:

receiving data specifying a type of the privacy mask overlay.

10. The computer program product of claim 8, wherein, if the type of the privacy mask overlay is an opaque privacy mask, determining a reduced amount of motion includes deducting from the estimated original total amount of motion all motion occurring behind the opaque privacy mask overlay.

11. The computer program product of claim 8, wherein, if the type of the privacy mask is a pixilation privacy mask overlay, determining a reduced amount of motion includes deducting from the estimated original total amount of motion a portion of the motion occurring behind the pixelation privacy mask.

12. The computer program product of claim 8, wherein the temporal frame distance is adjusted dynamically in response to receiving and determining reduced amounts of motion for additional frames in the video sequence.

* * * * *